United States Patent
Chen et al.

(10) Patent No.: US 10,223,704 B2
(45) Date of Patent: Mar. 5, 2019

(54) SYSTEM AND METHOD OF NOTIFYING USER NEAR POINT OF SALE LOCATION OF AVAILABLE REWARDS AT THE POINT OF SALE LOCATION

(71) Applicant: Capital One Financial Corporation, McLean, VA (US)

(72) Inventors: Lianghan Chen, Richmond, VA (US); Kevin Correll, Richmond, VA (US); Leon Telyaz, Richmond, VA (US); Nicole E. Pivnick, Richmond, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/663,208

(22) Filed: Jul. 28, 2017

(65) Prior Publication Data

US 2017/0337563 A1    Nov. 23, 2017

Related U.S. Application Data

(63) Continuation of application No. 13/069,785, filed on Mar. 23, 2011, now Pat. No. 9,754,267, which is a continuation of application No. 11/561,210, filed on Nov. 17, 2006, now Pat. No. 7,934,639.

(51) Int. Cl.
*G06F 17/00*    (2006.01)
*G06Q 30/02*    (2012.01)
*G06Q 20/20*    (2012.01)
*G06K 17/00*    (2006.01)

(52) U.S. Cl.
CPC ............. *G06Q 30/02* (2013.01); *G06Q 20/20* (2013.01); *G06Q 20/204* (2013.01); *G06K 17/00* (2013.01)

(58) Field of Classification Search
CPC ................................ G06C 30/02; G06K 17/00
USPC ............... 235/375, 379, 380, 383, 451, 492
See application file for complete search history.

(56) References Cited

U.S. PATENT DOCUMENTS

| | | | | |
|---|---|---|---|---|
| 5,832,457 A * | 11/1998 | O'Brien | ................. | G06Q 20/20 705/14.13 |
| 6,018,718 A * | 1/2000 | Walker | ................... | G06Q 20/10 705/14.17 |
| 6,129,274 A * | 10/2000 | Suzuki | ................... | G06Q 20/20 235/380 |
| 6,314,406 B1 * | 11/2001 | O'Hagan | ............. | G06K 7/0004 705/14.23 |
| 6,587,835 B1 * | 7/2003 | Treyz | ..................... | G06Q 20/12 705/14.64 |
| 6,684,195 B1 * | 1/2004 | Deaton | ................ | G06Q 20/387 705/14.13 |
| 6,925,565 B2 * | 8/2005 | Black | .................. | G06F 3/03545 713/176 |
| 2001/0014870 A1 * | 8/2001 | Saito | ..................... | G06Q 20/204 705/14.26 |
| 2002/0010629 A1 * | 1/2002 | Diamond | ............... | G06Q 30/02 705/14.13 |
| 2002/0042743 A1 * | 4/2002 | Ortiz | ..................... | G06Q 20/10 705/14.38 |

(Continued)

*Primary Examiner* — Paultep Savusdiphol
(74) *Attorney, Agent, or Firm* — Troutman Sanders LLP; Christopher J. Forstner; John A. Morrissett (57) ABSTRACT

Systems and methods for a point of sale reward system are provided. The system notifies users proximate to a point of sale location of rewards available for redemption specific to that user at that specific point of sale location.

20 Claims, 8 Drawing Sheets

(56) References Cited

U.S. PATENT DOCUMENTS

| | | | |
|---|---|---|---|
| 2002/0042774 A1* | 4/2002 | Ortiz | G06Q 20/06 705/39 |
| 2002/0152123 A1* | 10/2002 | Giordano | G06Q 20/04 705/14.33 |
| 2003/0004812 A1* | 1/2003 | Kasasaku | G06Q 20/20 705/21 |
| 2003/0105667 A1* | 6/2003 | Millikan | G06Q 30/02 705/14.58 |
| 2003/0163373 A1* | 8/2003 | Cornateanu | G06Q 30/02 705/14.26 |
| 2003/0205617 A1* | 11/2003 | Allen | G06Q 30/02 235/380 |
| 2003/0220835 A1* | 11/2003 | Barnes, Jr. | G06Q 10/1053 705/14.36 |
| 2004/0030601 A1* | 2/2004 | Pond | B67D 7/145 705/16 |
| 2004/0058717 A1* | 3/2004 | McDonnell | H04W 48/16 455/567 |
| 2004/0143500 A1* | 7/2004 | Lopez | G06Q 30/02 705/14.38 |
| 2004/0143501 A1* | 7/2004 | Lopez | G06Q 30/02 705/14.38 |
| 2004/0172339 A1* | 9/2004 | Snelgrove | G06Q 20/00 705/26.1 |
| 2004/0230487 A1* | 11/2004 | Tripp | G06Q 20/20 705/16 |
| 2005/0108096 A1* | 5/2005 | Burger | G06F 21/32 705/14.38 |
| 2006/0173781 A1* | 8/2006 | Donner | G06Q 10/02 705/50 |
| 2006/0178986 A1* | 8/2006 | Giordano | G06Q 20/04 705/40 |
| 2006/0237531 A1* | 10/2006 | Heffez | G06Q 20/32 235/382 |
| 2007/0198432 A1* | 8/2007 | Pitroda | G06Q 20/02 705/64 |
| 2008/0011837 A1* | 1/2008 | Wesley | G06Q 20/20 235/383 |
| 2008/0035724 A1* | 2/2008 | Vawter | G06Q 20/20 235/380 |
| 2008/0133339 A1* | 6/2008 | Drakoulis | G06Q 30/02 705/14.27 |
| 2008/0257958 A1* | 10/2008 | Rothwell | G06Q 20/20 235/380 |

* cited by examiner

SYSTEM AND METHOD OF NOTIFYING USER NEAR POINT OF SALE LOCATION OF AVAILABLE REWARDS AT THE POINT OF SALE LOCATION

CROSS-REFERENCE TO RELATED APPLICATIONS

This application is a continuation of U.S. patent application Ser. No. 13/069,785, filed Mar. 23, 2011, which has since issued as U.S. Pat. No. 9,754,267, which is a continuation of U.S. patent application Ser. No. 11/561,210, filed Nov. 17, 2006, which has since issued as U.S. Pat. No. 7,934,639, the disclosure of which is expressly incorporated herein by reference in its entirety.

FIELD OF THE INVENTION

The present invention relates to a system and method for notifying a user near a point of sale location of available rewards at the point of sale location.

BACKGROUND OF THE INVENTION

Users of financial cards that provide rewards for use must currently interact with the issuing financial card company to select specific rewards that are then shipped to the user. This usually requires that the user browse pictures of reward items through a catalog or on a web page. Thus, the user may not have the ability to physically interact with or inspect the items prior to selection. Also, the user is limited to the items that the financial card company wishes to offer as a reward, and is limited to the merchants that the financial card company chooses to associate with. Finally, the process of browsing for reward items and then selecting one or more is time consuming and a potentially lengthy process. these current processes may lead the user to a dissatisfying experience with the reward financial card.

SUMMARY OF THE INVENTION

Accordingly, various embodiments of the present invention directed to a system and method for creating a point of sale reward system are provided. A system may receive information identifying a user in proximity to a point of sale location and then provide the user notification of available rewards for that particular user at the point of sale location based on a rewards account associated with that particular user. The information may be sent to the system by a system that receives information at a location proximate to a point of sale location that is used to identify a user associated with a rewards account and transmits the information to a rewards system, whereby the rewards system may use the information to identify reward information available to the user at the point of sale location and send a notification to the user related to the rewards for that user at a point of sale location to which the user is proximate. The user may provide identification at the point of sale to facilitate notification of particular rewards, and the rewards may be provided to the user at the point of sale. The user may be notified in many potential ways. For example, and without limitation, the user may be notified of rewards via a text message to the user's cellular telephone, a voice mail message, an e-mail, or a web page. The method of notification may optionally be associated with the user's reward account. The identification that the user may provide at the point of sale may include biometric data or data from a financial card read with a card reader. Or, the user identification may be a username and password combination that the user may enter at the point of sale location. Further, the user may be located using global positioning system information.

Other embodiments are also within the scope of the invention.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which.

DETAILED DESCRIPTION

The following description is intended to convey a thorough understanding of the embodiments described by providing a number of specific embodiments and details involving systems and methods for a point of sale reward system. It should be appreciated, however, that the present invention is not limited to these specific embodiments and details, which are exemplary only. It is further understood that one possessing ordinary skill in the art, in like of known systems and methods, would appreciate the use of the invention for its intended purposes and benefits in any number of alternative embodiments, depending on specific design and other needs.

According to various embodiments of the present invention, a user accumulates reward points (e.g., miles or points) which may be associated with a user's account (e.g., a credit card account), and the point of sale reward system receives preference information from the user. The entity associated with the user's account typically engaged with agreements with several vendors to allow the user to exchange the points earned for merchandise or services. To enable the user to know where to use the points, various embodiments herein described provide a point of sale reward system that recognizes when the user is in proximity to a point of sale location (e.g., when the enter the store or are near the store, when the user is within one mile of the store using GPS technology, when the user swipes a card associated with the account at a mall entrance where the store (POS location) is in the mall, when the user pays for an item at a POS location proximate to another POS location where an award may be found, etc.), and transmits reward information that the user may redeem at that point of sale location (e.g., "For 500 points, you can get the new SuperVideo console at StoreA") The user may redeem a reward if the user chooses, and the amount of the reward may be offset from the user's account.

A user 201 may apply for and receive an account associated with a financial instrument (e.g., credit card, debit card, or other like instruments). The financial account may have associated with it a system to provide rewards to the user. The financial card may be a credit card, but need not be. The financial card may contain a number printed on the financial card, and optionally also contains a magnetic area encoded with the number or other information. Optionally, the financial card contains a radio frequency identification ("RFID") device. In the application process or afterward, the user 201 provides identification information to the financial card company. This identification information may include, but is not limited to, the user's address, the user's home telephone number, the user's cellular telephone number, the user's e-mail address, a username and password combination, or biometric information about the user 201. The biometric information may include, for example, data concerning the user's hand, fingertips, voice, iris, retina, face, signature, gait, or any other suitably unique characteristic of the user.

Figure 1:
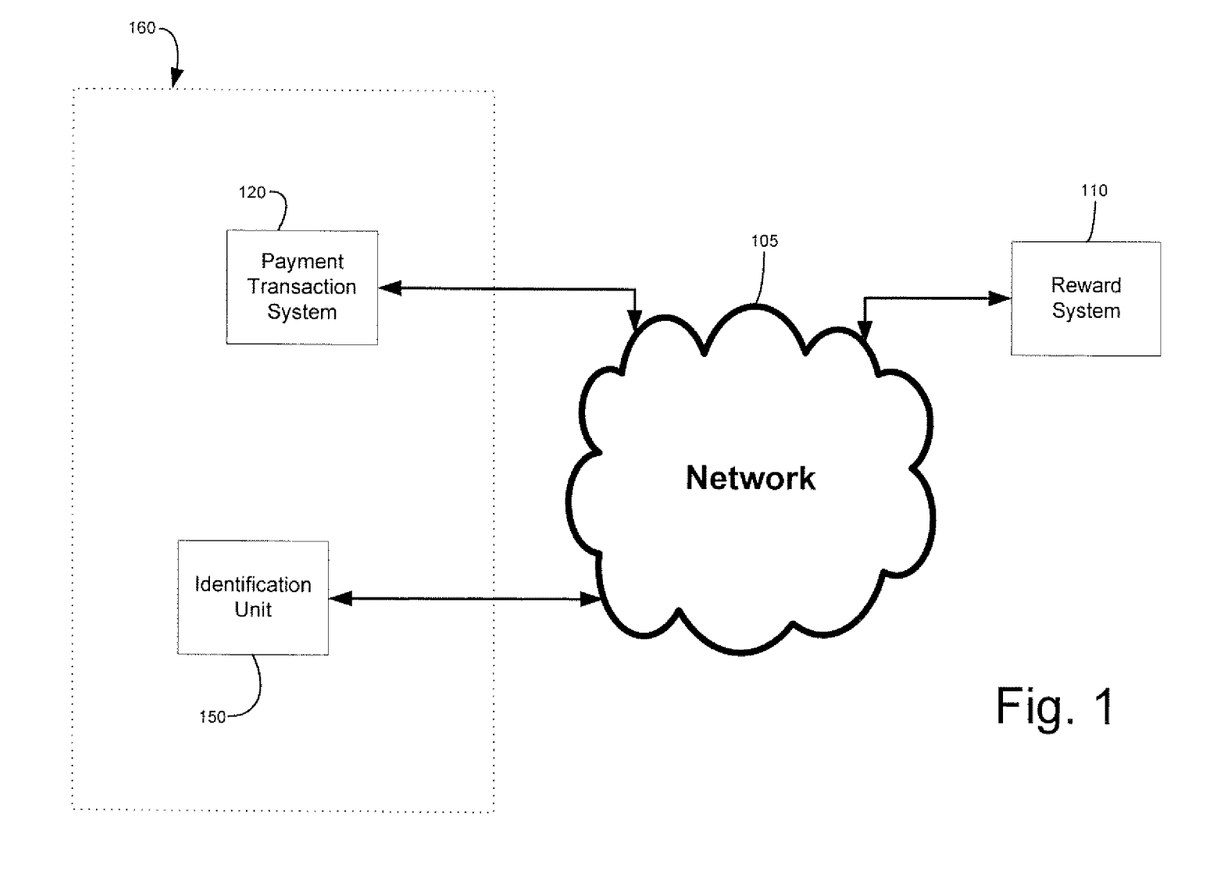
FIG. 1 is a system level block diagram illustrating components of a system for a notification and point of sale reward system according to at least one embodiment of the invention.

As shown in FIG. 1, a point of sale reward system is shown. The point of sale reward system uses a network 105. A reward system 110, a payment transaction system 120, and an identification unit 150 may be connected to or have access to the network 105. For example, the reward system 110, payment transaction system 120, and identification unit 150 may communicate with each other using the network 105.

Reward points may be earned by the user 201 for a wide variety of reasons, for example, by making purchases with the financial card. For example, as is known in the art, for every dollar spent using the financial instrument, the user may earn one "point" or some other number of points. Reward points may also be awarded by the financial card company for any reason, may be bought by the user 201 from the financial card company, or may be awarded by a third party for any reason. The reward points are associated with the user's account. The system may also enable users to purchase points, which users might use if a certain number of points is needed for an award.

Figure 2:
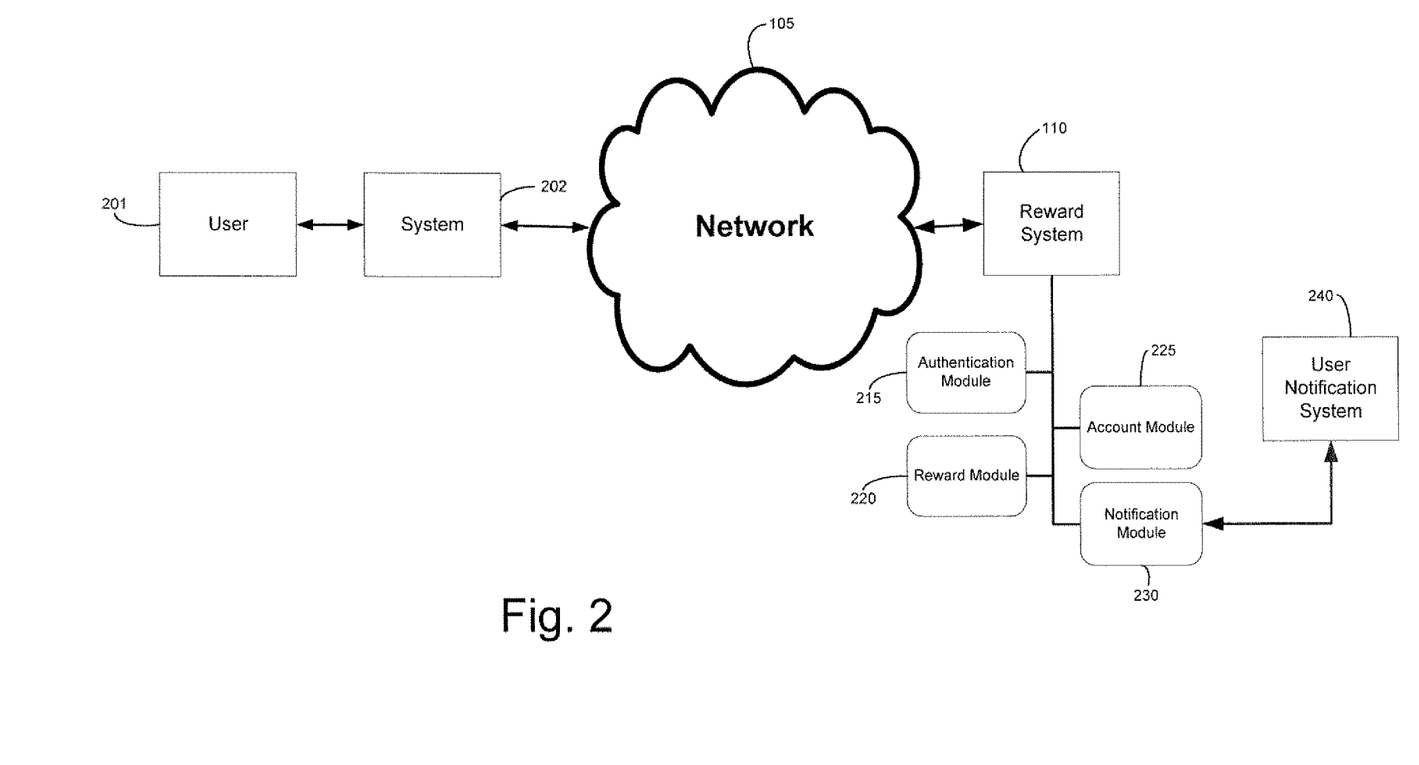
FIG. 2 is a system level block diagram illustrating the various components of a reward system according to at least one embodiment of the invention.

As shown in FIG. 2, the user's identification information may be associated with the user's account and stored in a reward system 110 located remotely from the user 201. The reward points that are earned, awarded, or bought may be accumulated and may be associated with the user's identification information in the reward system 110. The reward system 110 may contain one or more of the following modules: an authentication module 215, an account module 225, a reward module 220, and a notification module 230. The authentication module 215, the account module 225, the reward module 220, and the notification module 230 may communicate with some or all of the modules. The modules of the reward system may be part of a single system, or the modules may be physically or logically separated. The reward system 110 may be operably connected to the network 105 so that the reward system modules are able to receive signals from the network and generate signals to the network.

The authentication module 215 may receive authentication information (e.g., as signals from the network 105), and may attempt to match the authentication information to a record in the reward system 110. In an embodiment, the authentication information may be received as encrypted ciphertext and decrypted according to protocols well known in the art. If the authentication information matches identification information of user 201 in the reward system 110, then the user 201 may be allowed to proceed. If the authentication information does not match identification information of user 201 in the reward system 110, the user 201 may not be not allowed to proceed. The account module 225 may contain a plurality of user's account information. For example, the account module 225 may contain the user's unique number, the user's telephone number, the user's cellular telephone number, and the user's e-mail address. In one exemplary embodiment, the account module 225 may store a plurality of users and their related account information in a database. The user's account information may include, but is not limited to, the amount of reward points that the user 201 has accumulated.

The reward module 220 may contain information on one or more of the possible rewards that are available from the financial card company. For example, the reward module 220 may include the name of a store (e.g., Store A at 1550 Maple Avenue, Richmond, Va.) or retailer (Store A) in which the reward may be found, a description and picture of the reward, and the number of reward points required to obtain the reward. In one exemplary embodiment, the reward module 220 may store a plurality of items and associated information in a database. The notification module 230 may comprise hardware, software, or a combination of hardware and software operable to notify a user notification system 240. For example, the notification module 230 may notify the user by sending a user notification system 240 synthesized voice signals, or by sending a user an e-mail or a text message, or by any other notification style as known in the art. The reward system 110 may contain a display module operable to display the information gathered from the reward system 110 in a form the user 201 can perceive with the system 202. In one embodiment, the display module may be a web server to organize and display information viewable on software installed on the system 202.

The user 201 may operate a user system 202 to interface with the reward system 110. The system 202 may be in communication with the reward system 110 via the network 105. In one embodiment, the system 202 contains an interface to view information received from the reward system 110 over the network 105. A system 202 may include, but is not limited to: e.g., any computer device, or communications device including, e.g., a personal computer (PC), a workstation, a mobile device, a phone, a handheld PC, a personal digital assistant (FDA), a thin system, a fat system, an network appliance, an Internet browser, a paging, an alert device, a television, an interactive television, a receiver, a tuner, a high definition (HD) television, an HD receiver, a video-on-demand (VOD) system, a server, or other device.

Though not depicted in FIG. 2, those of ordinary skill in the art will appreciate that a plurality of potential systems 202 may be used by the user 201 to input and view reward information and reward preferences. For example, if the network 105 comprises the Internet, the system 202 may interact with the reward system 110 to view information and input preferences via a web browser client installed on the user's computer, such as INTERNET EXPLORER, NAVIGATOR, or FIREFOX web browser programs, offered by Microsoft Corporation of Redmond, Wash., Time Warner of New York, N.Y., and the Mozilla Foundation of Mountain View, Calif., respectively. Those of ordinary skill in the art will appreciate that computer systems may include traditional desktop and laptop computer systems as well as Personal Digital Assistants (PDAs), mobile phones, BLACKBERRY devices, and other portable communication devices. These devices all typically include some form of browser client that enables a person to view content delivered across the Internet. Web browser programs may include HTTP browsers, as well as Wireless Application Protocol (WAP) browsers, or any other suitable browser based on currently known or previously un-standardized Internet protocols.

In an embodiment, the user 201 may use a telephone to communicate with a customer service representative, and the customer service representative creates or changes the user's information or preferences in the reward system 110. The user 201 may also send information on preferences through the mail or facsimile where a customer service representative receives the letter or facsimile and creates or changes the user's information or preferences in the reward system 110.

Figure 3:
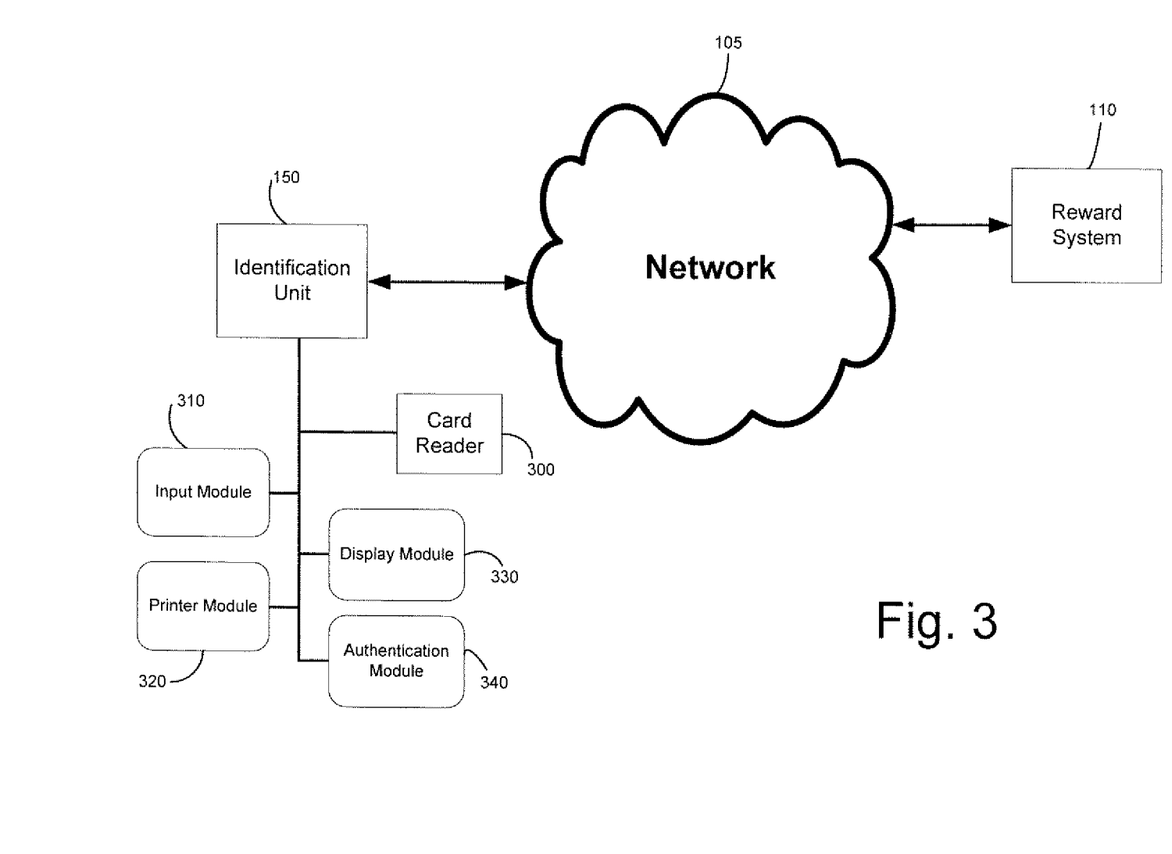
FIG. 3 is a system level block diagram illustrating various components of an identification unit according to at least one embodiment of the invention.

Turning now to FIG. 3, an example of an identification unit 150 is shown. The identification unit 150 may be placed at or near a point of sale location and may be operable to identify a user 201 in proximity. One embodiment of an identification unit 150 may comprise one or more of the following: an input module 310, a printer module 320, and a display module 330. The identification unit 150 may be operably connected to the network 105, so that it may be in communication with the reward system 110. In one embodiment, a card reader 300 may be in communication with the identification unit 150. The card reader 300 may contain a magnetic reading unit to read the magnetic area on the user's financial card. It should be appreciated by one skilled in the art that many other identification measures are possible.

For example, the identification unit 150 may read the user's financial card by an optical mechanism or may use a RFID reader to read a RFID device in the user's financial card. Or, the identification unit 150 may contain a biometric reader to input a user's biometric information into the identification unit 150, for example a fingerprint, palm, voice, iris, retina, face, signature, or gait reader, or any other kind of reader that can identify a suitably unique characteristic of a given user 201. The identification unit 150 shown in FIG. 3 may also comprise one of more of the following: an authentication module 340, a display module 330, and a printer module 320. The card reader 300, authentication module 340, display module 330, and printer module 320 may all be interoperably connected. The card reader 300 may operate to receive the unique identification information from the user's financial card, and transmits the unique identification information to the identification unit 150. The authentication module 340 may receive signals from the card reader 300 and examines them to ensure they are of the proper type. If the signals received from the card reader 300 are not of the proper type (e.g., the card was misread or an improper card was used with the card reader 300), the authentication module 340 may not allow the user 201 to proceed using the identification unit 150. The display module 330 may display information received from the user's financial card or from the network 105. The printer module 320 may create a tangible copy of information from signals received from the network 105 and the card reader 300.

While the identification unit 150 has been shown to be interactive, it should be appreciated by one of ordinary skill in the art that the identification unit may operate with little or no interactivity. In some examples, the identification unit 150 may not be visible to the user 201 whatsoever. The identification unit 150 may be a device to identify one or more users based on observable biometric data, for example a user's gait, head, face, retina, iris, voice, or any other observable characteristic so that the user does not have to interact with the identification unit. Further, the financial card or associated device (e.g., the user system or user notification system) may have a global positioning system ("GPS") transmitter, which could transmit GPS location information to the identification unit 150. The identification unit 150 may also use GPS or other location-tracking techniques associated with a device associated with a user to determine proximity (e.g., GPS on the user's automobile, UPS and/or triangulation on a telecommunications device associated with the user, etc.). For example, GPS information from a handheld or automobile-installed navigation system may be transmitted to the reward system. The GPS information may be used in this way by the reward system to locate an individual and to send reward information to the user notification system 240. Identification unit 150 may also comprise another POS payment system where the user pays for an item using a financial instrument associated with the user and/or account. For example, if the user pays for groceries using a credit card at a POS device in a shopping center, that information may be transmitted to the system to enable the system to identify rewards at a POS location in another proximate POS location (e.g., the next-door drug store or discount retailer). Also, it should be appreciated by one of ordinary skill in the art that the reward system 110 need not authenticate the user 201. The identification unit 150 may operate to send information describing the user 201 to the reward system 110 such that if no user 201 is found matching the information transmitted from the identification unit 150, the reward system 110 may not send reward information to the user 201.

Figure 4:
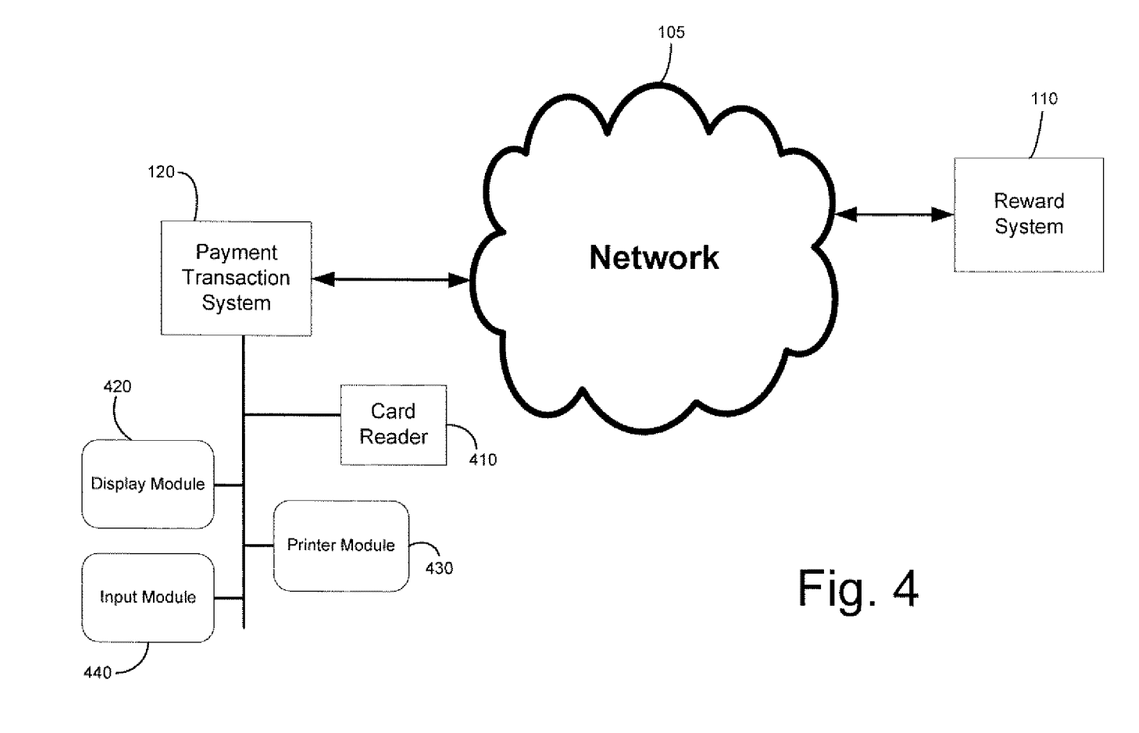
FIG. 4 is a system level block diagram illustrating various components of a payment transaction system according to at least one embodiment of the invention.

Turning now to FIG. 4, one embodiment of a payment transaction system is shown. The payment transaction system 120 may be operable to tally the items that the user 201 has bought and enable the user 201 to pay for the purchased items. The payment transaction system 120 may be operably connected to the network 105, so that it may be in communication with the reward system 110. In one embodiment, a card reader 410 may be operably connected to the payment transaction system 120. The card reader 410 may contain a magnetic reading unit to read the magnetic area on the user's financial card, or alternatively, for example, may read the user's financial card by optical means or may contain a RFID reader. One embodiment of the payment transaction system 120 also contains a display module 420, a printer module 430, and an input module 440. The display module 420, the printer module 430, and the input module 440 may all be in communication with each other. The display module 420 may display information received from the user's financial card, from the payment transaction system 120, or from the network 105. The printer module 430 may create a tangible copy of information of signals received from the network 105, the payment transaction system 120, or the card reader 410. The input module 440 may identify items that the user 201 wishes to purchase. For example, the input module 440 may include a bar code reader, so that an operator of the payment transaction system 120 may read the bar codes of the particular items that the user 201 wishes to purchase.

A network 105 may include, but is not limited to: e.g., a wide area network (WAN), a local area network (LAN), a global network such as the Internet, a telephone network such as a public switch telephone network, a wireless communication network, a cellular network, an intranet, or the like, or any combination thereof. In exemplary embodiments of the invention, the network may include one, or any number of the exemplary types of networks mentioned above operating as a stand-alone network or in cooperation with each other. Use of the term network herein is not intended to limit the network to a single network.

Figure 5:
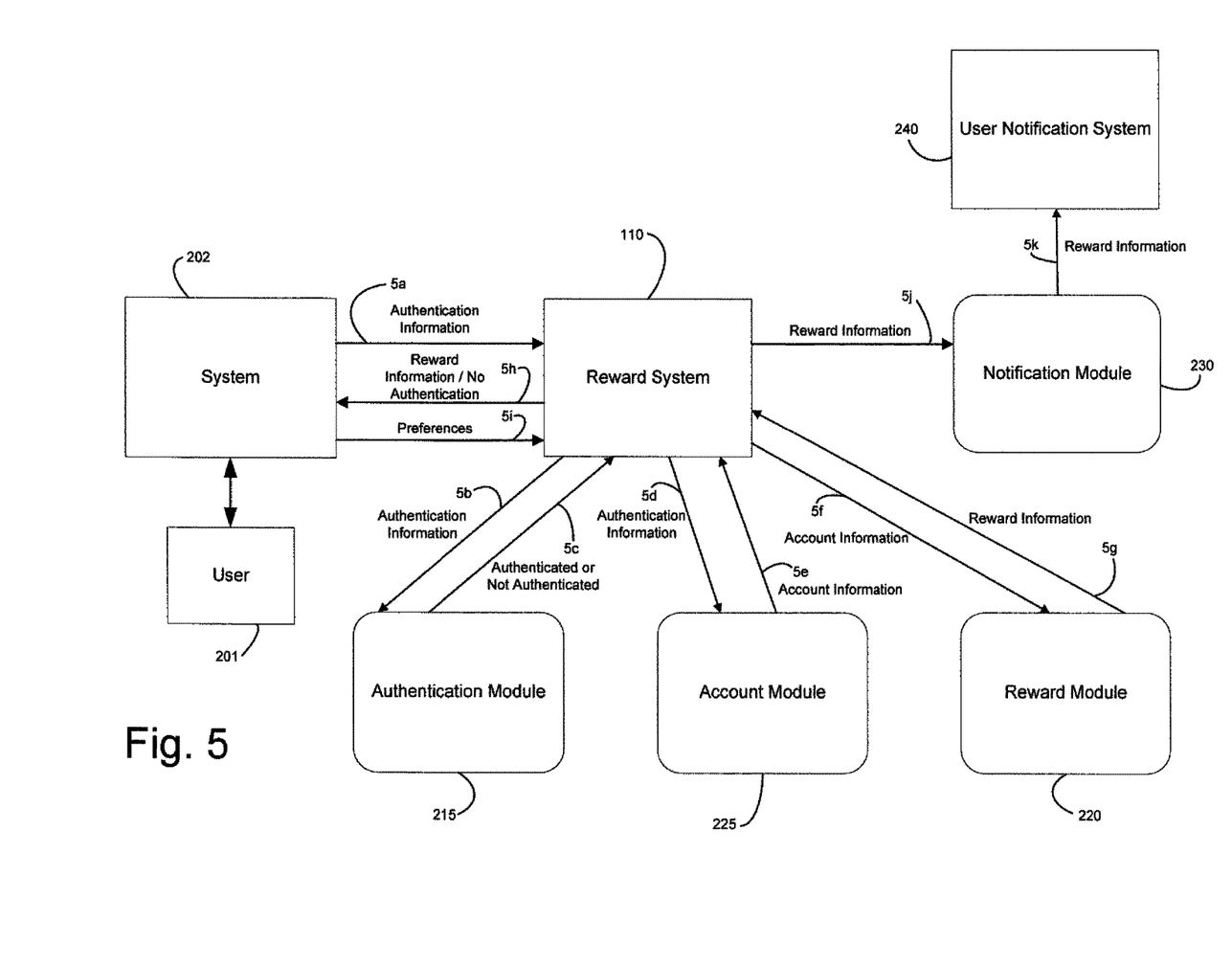
FIG. 5 is a flow chart detailing the actions of the user viewing rewards and setting preferences in the reward system according to at least one embodiment of the invention.

As shown in FIG. 5, the user 201 accesses the reward system 110 via the system 202. In action 5*a*, the user 201 may request that the system 202 send authentication information to the reward system 110. Authentication information may include, but is not limited to, a username and password combination, a username, biometric information, information contained on a smart card, or any other information unique to the user 201 that allows the user to authenticate. In action 5*b*, the reward system 110 may search the account module 225 for the user 201 based on the authentication information. If the authentication information transmitted from the system 202 matches the identification information contained in the account module 225, the authentication module 215 may authenticate the user 201, shown in action 5c. If the authentication information transmitted from the system 202 does not match the identification information contained in the account module 225, the authentication module 215 may produce an error that may be transmitted to the system 202 (action 5*h*), and the user 201 may be prompted to correct the authentication information before continuing. If authentication is not successful, the process may terminate. After correct authentication, the reward module 110 may send the authentication information to the account module 225 (action 5*d*), and the account module 225 may send the account information to the reward system 110 (action 5*e*). The reward system 110 may send the account information to the reward module 220 (action 5*f*), and the reward module 220 may send reward information to the reward system 110 (action 5*g*). The user 201 is thus granted access to the reward module 220 of the reward system 110 and the reward module 220 may transmit reward information to the system 202, shown in action 5*h*. In one embodiment, the user 201 may browse through the information contained in the reward module 220 of the reward system 110. The user 201 may select preferences based on the information transmitted from the reward module 220 of the reward system 110, and the preference information may be transmitted from the system 202 in action 5*i* and into the user's account information in the account module 225. The preferences may be, but are not limited to, a classification of items (e.g., athletic items or clothing), a price range, a store, or a range or amount of reward points. Optionally, the reward system 110 transmits the amount of reward points that the user 201 has accumulated to the system 202, so that the user 201 may set preferences using that information. When the user 201 is finished updating the reward information, the user 201 may close the session between the system 202 and the reward system. In an alternate embodiment, the action of selecting preferences is not required for the present invention, and the user 201 accumulates reward points without setting preferences.

Figure 7:
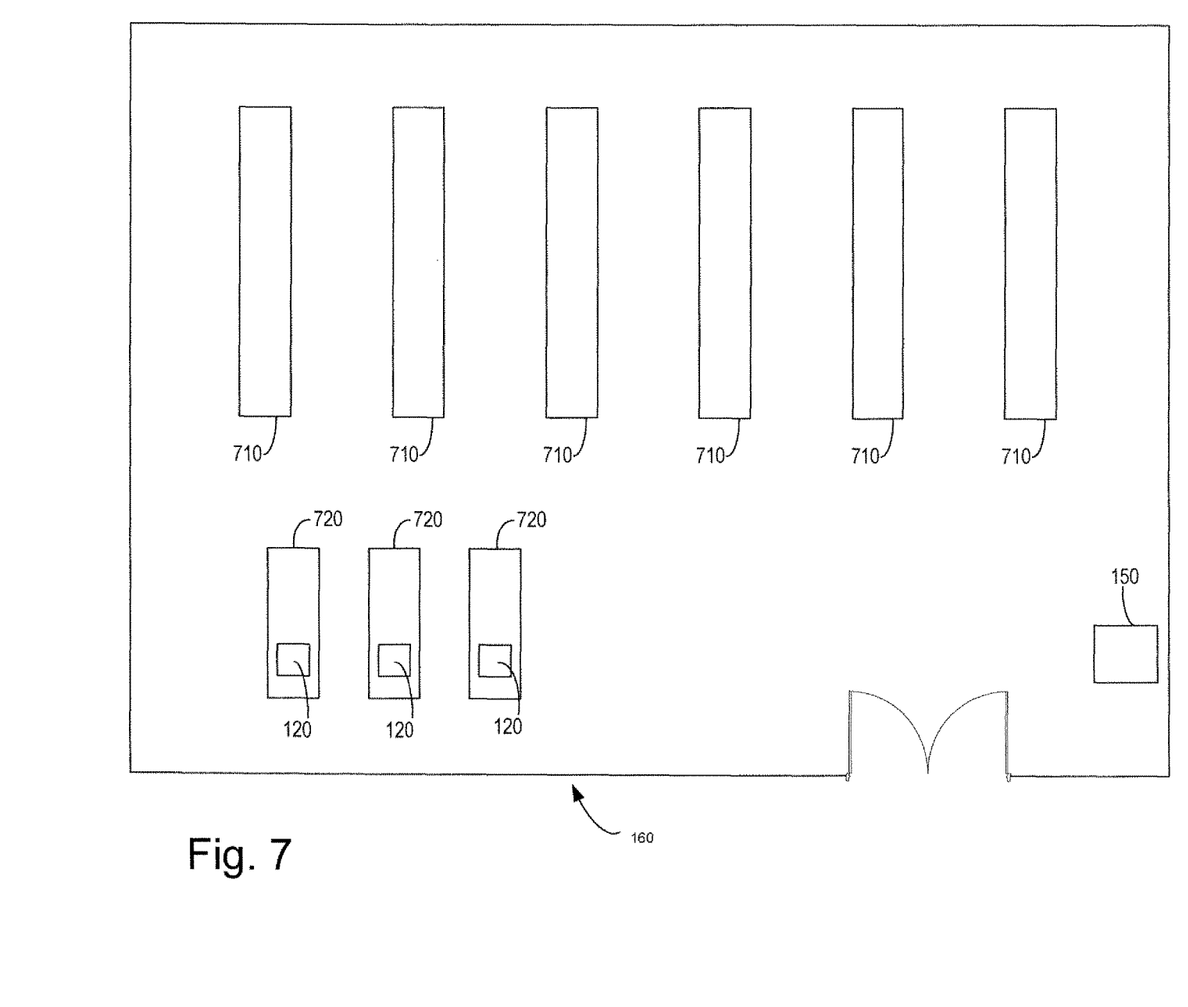
FIG. 7 is a block diagram showing an identification unit in at a point of sale location according to at least one embodiment of the invention.

The user 201 may interact with a point of sale. In the exemplary embodiment, the user 201 may be physically present at a point of sale location, but one of ordinary skill in the art will recognize that this is not required. The user 201 may use the telephone or other communication device to communicate with the point of sale remotely, or may interact with the point of sale systems via the system 202 or other communication system. Turning to FIG. 7, an exemplary diagram of a point of sale location is shown. The point of sale location 160 may have an entry, and an identification unit 150 may be, but is not required to be, in proximity to the entry. The point of sale location 160 may have one or more areas 710, where items are placed for user purchase. The point of sale location 160 may also have areas 720 including payment transaction systems 120, for users to complete purchases.

Figure 6:
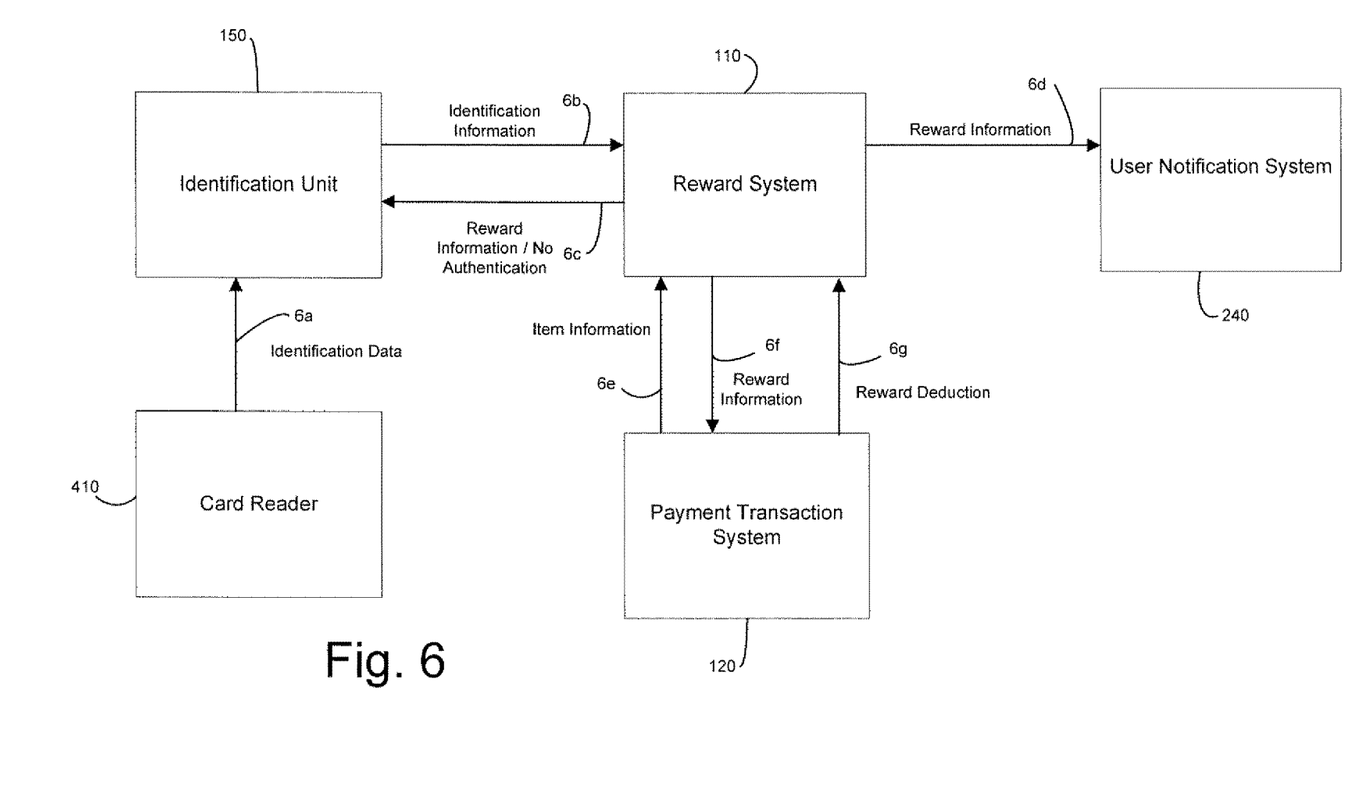
FIG. 6 is a flow chart detailing the actions of the user receiving reward information from an identification unit at a point of sale according to at least one embodiment of the invention.

Turning to FIG. 5, in the exemplary embodiment, the user 201 may place a financial card in the card reader 300, and the card reader 300 may read the information stored in the magnetic area of the financial card. The card reader 300 may communicate the information to the identification unit 150 in action 6*a*. In action 6*b*, the identification unit 150 may communicate the information to the reward system 110 across the network 105. The identification unit 150 may also transmit information to the reward system 110 containing a store identifier. In an embodiment, the identification unit 150 may contain an authentication module 340, which may operate on the information to determine if the information is valid, before transmitting the information to the reward system 110. If the information is not valid, the authentication module 340 may alert the user 201 with text on a display, one or more lights associated with the identification unit 150, or sound generated by a speaker associated with the identification unit 150. While the purpose of the card reader 300 is to provide information to send information to the reward system 110, one of ordinary skill in the art could imagine multiple alternatives to a magnetic card reader. For example, in exemplary alternate embodiments of the identification unit 150, the card reader 300 may contain an optical reader that may operate to read the user's card optically, or the card reader may be replaced with a biometric reader which may be operable to read a suitably unique feature of the user 201.

The reward system 110 may identify and/or authenticate the user 201 from the authentication information transmitted by the identification unit 150 by comparing it to the identification information associated with the user 201 in the account module 225. If the authentication information transmitted from the identification unit 150 matches the identification information contained in the account module 225, then the authentication module 215 may authenticate the user 201 and allow the user to proceed. If the authentication information transmitted from the identification unit 150 does not match the identification information contained in the account module 225, then the authentication module 215 may deny further access and may transmit a signal, shown in action 6*c* to the identification unit 150, so that the identification unit 150 may alert the user 201.

After the user 201 is identified, the reward system 110 may utilize the point of sale location identifier information (e.g., store, retailer, mall, etc.) and search the reward module 220 for rewards linked to the point of sale associated (e.g., within set preference ranges, within set distances, etc.) with the point of sale location identifier information. The reward system 110 may then apply the user's preferences from the account module 225 to narrow the possible rewards. Reward information and user information contained in account module 225 regarding notification may then be communicated to the notification module 230 (or a summary or notification that such information is available to the user). In action 6d, the notification module 230 may transmit the reward information to the user notification system 240 in the manner that the user has specified in the account information of the account module 225. The notification via the user notification system 240 may occur, for example, when the notification module 230 communicates with the network 105 to send the user 201 an e-mail about the available reward information, when the notification module 230 communicates with a telecommunication network to send the user 201 a voice recording or a text message about the available reward information, or any other method of notifying a user 201 of available reward information. At this step, the user 201 may be notified of potential rewards available in the particular point of sale.

In an embodiment of the identification unit 150, the user 201 may be able to interact with the reward system 110 and set preferences by interacting with the identification unit 150. The identification unit 150 of the embodiment would also have a display and an input device operably connected to the identification unit, capable of sending and displaying information transmitted from the reward system 110, shown in action 6c. The identification unit 150 may also have a display module 330 which displays information transmitted from the reward system 110, and also a printer module 320 which prints tangible copies of the information transmitted from the reward system 110. A tangible copy of reward information may allow the user 201 to easily find the particular reward item.

After the user 201 has been apprised of the rewards available in the particular point of sale, the user 201 may shop at the point of sale and choose items to purchase. If the particular reward is to receive a discount on a particular item or service, or to receive the particular item or service for free, then the user 201 may choose that particular item to bring to the checkout. If the particular reward is a general discount, then the user 201 may choose one or more items to bring to the checkout.

When the user 201 has finished choosing items or services to purchase, the user 201 may check out of the point of sale. The payment transaction system 120 may operate to total all of the items that the user 201 wishes to purchase, and to allow the user 201 to purchase the items. The input module 440 of the payment transaction system 120 may read the one or more items to be checked out. The user 201 or the attendant may operate the card reader 410 to read the magnetic area of the user's finical card. The information contained on the user's financial card and information from the items input into the payment transaction system 120 may be transmitted by the payment transaction system 120 across the network 105 to the reward system 110, shown in action 6e in FIG. 6. The reward system 110 may use the information contained on the user's financial card to authenticate the user 201, and interacts with the reward module 220 to determine the rewards available to the user 201 at the particular point of sale. If a reward is found, the information regarding the reward may be transmitted from the reward system 110 to the payment transaction system 120, as shown in action 6f. The payment transaction system 120 may apply the reward to the user's purchase, may transmit a signal for the successful application of the reward across the network 105 to the reward system 110 (action 6g), and may complete the sale of the one or more items. The reward system 110 may receive the signal for successful application, and may reduce the user's available reward points by the amount of the reward in the account module 225.

The methods of reward application include, but are not limited to, reducing the amount of sale by the amount of the reward at the payment transaction system 120 at the point of sale, causing the payment transaction system 120 to print a refund request, so that the user 201 may fill in information and claim a reward, or noting the reward claim in the reward system 110, where it may be acted on by the financial card company (i.e., to issue a refund of the amount of the reward, or to apply the reward as a credit against the user's financial card balance).

In an embodiment, where the user 201 interacts with the point of sale remotely over a network 105, or where the user 201 interacts with the point of sale remotely over a telephone, the process of checkout may occur similarly as above, except that the user 201 may not be in proximity to the payment transaction system 120. The payment transaction system 120 in this embodiment may operate similarly, but may be a module in the point of sale's network instead of a physical system operable to scan items. Also, it would be appreciated by one skilled in the art that the card reader may not be present in such a payment transaction system; the user 201 may transmit information froth a user's system to the point of sale's system, which then may communicate the information to the reward system and receive information from the reward system as in actions 6e, 6f, and 6g.

Figure 8:
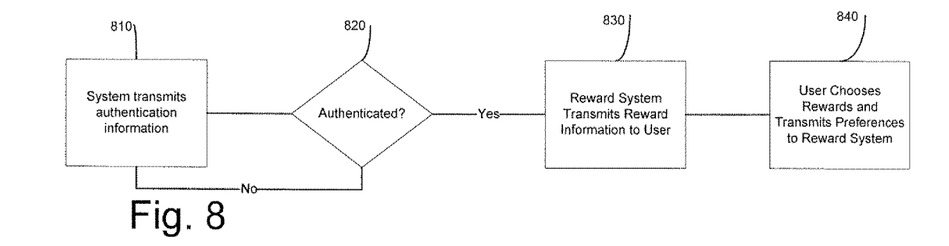
FIG. 8 is a flow chart illustrating actions of a user viewing rewards and setting preferences in the reward system according to at least one embodiment of the invention.

Turning to FIG. 8, a flowchart describing one embodiment of the method of choosing user preferences is shown. In block 810, the user system 202 may transmit authentication information to the reward system 110 110. In block 820, the reward system 110 may authenticate the user and may allow the user to proceed, or may not authenticate the user 201 and may not allow the user to proceed. If the user 201 proceeds from block 820, the reward system 110 may transmit reward information to the user's system. In block 830, the user 201 then may choose rewards from the information transmitted from block 820 and may transmit that preference information to the reward system 110. The reward system 110 may then associate the preference information with the user's account.

Figure 9:
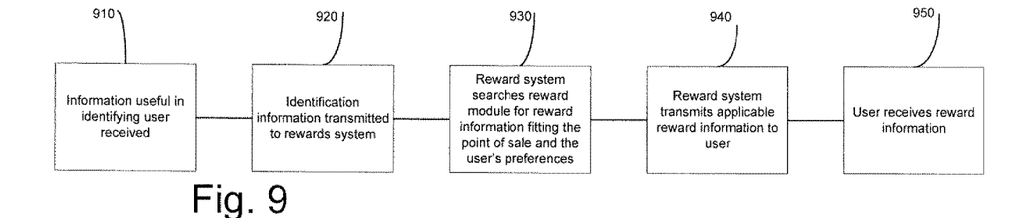
FIG. 9 is a flow chart illustrating actions of a user receiving reward information from a reward system according to at least one embodiment of the invention.

Turning to FIG. 9, a flowchart describing one embodiment of the method for the user 201 receiving reward information is shown. In block 910, the identification unit 150 may receive information useful in identifying the user (e.g., information input from the user to identify the user, identify a card for the user, etc.). In block 920, the identification unit 150 may transmit the identification information to the reward system 110. In block 930, the reward system 110 may search the reward module 220 for reward information applicable to the user and the point of sale location. In block 940, the reward system 110 may transmit the applicable reward information to the user notification system 240. The user 201 then may receive the reward information via the user notification system 240 shown in block 950.

Figure 10:
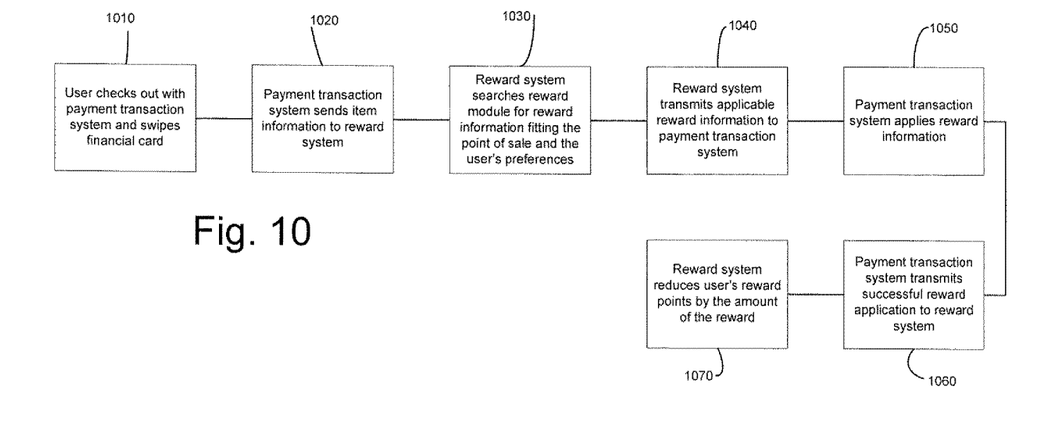
FIG. 10 is a flow chart illustrating actions of a user receiving rewards from a reward system according to at least one embodiment of the invention.

Turning to FIG. 10, a flowchart describing one embodiment of the method for the user 201 receiving a reward is shown. In block 1010, the user 201 may interact with the payment transaction system 120 and may input information from the user's financial card. In block 1020, the payment transaction system 120 may transmit item information to the reward system 110. In block 1030, the reward system 110 may search the reward module 220 for reward information fitting the point of sale location, the user's preferences, and the item information. In block 1040, the reward system 110 may transmit reward information from the search detailed in block 1030 to the payment transaction system 120. In block 1050, the payment transaction system may receive the reward information and may apply it (e.g., by removing all or part of the cost of one of the items, or by creating a rebate). In block 1060, the payment transaction system 120 may transmit a successful reward application to the reward system 110, and in block 1070, the reward system 110 may reduce the user's reward points by the amount of the successful reward.

The present invention encourages spending at a point of sale location by offering reward information about items in the point of sale location to the user while the user is in proximity to the point of sale location. By providing incentives to get the user to visit the point of sale location to redeem a reward, the point of sale location benefits when the user then makes additional purchases at the point of sale location. For example, if the user is informed that she can redeem 500 points for a new telephone at StoreA, StoreA benefits when the user visits StoreA and redeems points for the telephone and also purchases other items during the visit. Thus, this system creates incentives for participation by point of sale locations as a way of attracting customers into the point of sale location.

The present invention also encourages loyalty to the financial institution employing the present invention, as the rewards may be linked to prior purchases and enables them to use the rewards they earn. This overcomes frustration for users in many current rewards programs of points that are earned but never redeemed because of the complexity of the rewards programs. Finally, the present invention helps the user to identify available rewards, to receive reward information, and to redeem rewards in a faster and more unobtrusive way.

The embodiments of the present inventions are not to be limited in scope by the specific embodiments described herein. For example, the point of sale may be located remotely from the user, accessible by telephone or over a network. Or, the reward system may be a collection of more than one computer, each operating collectively as the reward system. Or, the payment transaction system may operate without an operator, for example by self-checkout, or may have an automated system that does not require interaction with an operator or a user. Thus, such modifications are intended to fall within the scope of the following appended claims. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A method comprising:
   receiving, at a backend rewards processor, one or more user preferences associated with a rewards account of a user;
   receiving, at the backend rewards processor, identification information and a current location of the user, the current location of the user being received in response to a user transaction at a first point of sale (POS) system and based on first POS system identifier information;
   accessing, in a database associated with the backend rewards processor, the rewards account of the user based on the identification information to determine available rewards, wherein the determination of the available rewards is based at least in part on the one or more user preferences;
   determining, by the backend rewards processor and based on the current location of the user, a merchant within a predetermined distance of the current location of the user, the merchant being associated with the determined available rewards; and
   transmitting, from a user notification system integrated with the backend rewards processor via a network, a notification to a device associated with the user, the notification comprising data indicative of the available rewards and the merchant within the predetermined distance of the current location of the user.

2. The method of claim 1, wherein the merchant comprises a second POS system.

3. The method of claim 2, wherein at least one of the first POS system and the second POS system comprises:
   an account reader;
   a display; and
   an input/output module connectively coupling the POS system to the network.

4. The method of claim 1, wherein the identification information is compared to authentication information to authenticate the user.

5. The method of claim 4, wherein the authentication information is received as encrypted ciphertext and decrypted according to one or more protocols.

6. The method of claim 1, wherein the one or more preferences comprises at least one of: a classification of one or more items, a price range, a store, and a range or amount of reward points.

7. The method of claim 1, wherein the available rewards comprises at least one of: a specific discount, a general discount, a refund, and a reward points redemption.

8. The method of claim 1, wherein accessing the rewards account of the user to determine available rewards is based on authenticated identification information.

9. The method of claim 1 further comprising receiving, at the backend rewards processor, redemption data associated with the notification.

10. The method of claim 1, wherein the notification comprises at least one of: a text message, a voice mail message, an e-mail, and a web page.

11. A rewards system, comprising:
    a database that stores a rewards account of a user; and
    a rewards processor connected to the database, the rewards processor configured to:
    receive one or more user preferences associated with the rewards account of the user;
    receive identification information and a current location of the user, the current location being received in response to a user transaction at a first point of sale (POS) system and based on first POS system identifier information;
    access the rewards account of the user stored in the database based on the identification information to determine available rewards, wherein the determination of the available rewards is based at least in part on the one or more user preferences;

determine, based on the current location of the user, a merchant within a predetermined distance of the current location of the user, the merchant being associated with the determined available rewards; and transmit, from a user notification system integrated with the rewards processor via a network, a notification to a device associated with the user, the notification comprising data indicative of the available rewards and the merchant within the predetermined distance of the current location of the user.

12. The system of claim 11, wherein the merchant comprises a second POS system.

13. The system of claim 12, wherein at least one of the first POS system and the second POS system comprises:
an account reader;
a display; and
an input/output module connectively coupling the POS system to the network.

14. The system of claim 11, wherein the identification information is compared to authentication information to authenticate the user.

15. The system of claim 14, wherein the authentication information is received as encrypted ciphertext and decrypted according to one or more protocols.

16. The system of claim 11, wherein the one or more preferences comprises at least one of: a classification of one or more items, a price range, a store, and a range or amount of reward points.

17. The system of claim 11, further comprising receiving, at the backend rewards processor, redemption data associated with the notification.

18. The system of claim 17, wherein the redemption data is received from a server based on the use of a transaction card at the merchant.

19. The system of claim 11, wherein the available rewards comprises at least one of: a specific discount, a general discount, a refund, and a reward points redemption.

20. The system of claim 11, wherein access the rewards account to determine available rewards is based on authenticated identification information.

* * * * *